Nov. 15, 1949     E. L. HARDER     2,488,399
REGULATING SYSTEM
Filed Aug. 30, 1946
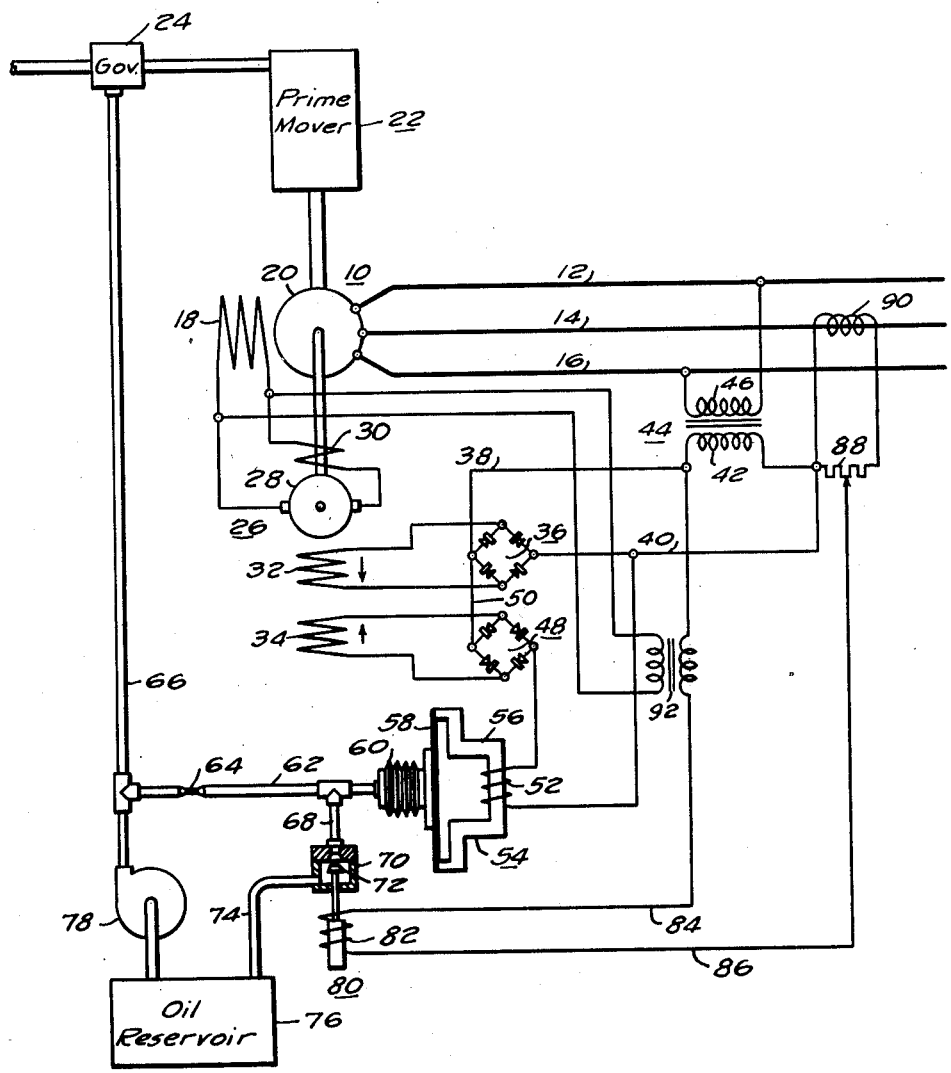
WITNESSES:
INVENTOR
Edwin L. Harder.
BY
ATTORNEY Patented Nov. 15, 1949

2,488,399

UNITED STATES PATENT OFFICE 2,488,399

REGULATING SYSTEM

Edwin L. Harder, Pittsburgh, Pa., assignor to Westinghouse Electric Corporation, East Pittsburgh, Pa., a corporation of Pennsylvania Application August 30, 1946, Serial No. 694,069

8 Claims. (Cl. 290—7)

This invention relates to regulating systems.

Regulating systems of the indirect acting type where a motor operated rheostat and field forcing contactors in the exciter field are utilized, and of the direct acting type are well known. The indirect acting type of regulators are generally employed in connection with large machines on steady load utility systems whereas the direct acting type of regulators are generally employed with small machines.

Where the loads on the large machines are frequently changing and the regulator must be in more or less continuous action as for example, where a utility is using remote hydro power when such is available and steam power at other times, a severe regulating problem is encountered because of the relatively small capacity of the steam machines and frequency changers during the period of good hydro power. This problem is further complicated if the system is supplying power to rolling mills or the like or for railway electrification where heavy changing loads are encountered.

With the indirect acting regulators it is found that on parallel machines the voltages of the two regulators may at any time be anywhere within the sensitivity band of the respective regulator but still be apart by more than the sensitivity of either regulator because of the wattless difference between the machines. In other words, a wattless difference between machines may occur equal to double the sensitivity band divided by the per unit reactive droop compensation in use. Thus although the voltage of the parallel machines has been returned to within the sensitivity band of each machine, the regulators have acted differently and the field current changes have not been exactly proportional and there is not enough of a voltage departure of either machine to cause further correction. Such regulating action of parallel connected machines is not desirable.

On the other hand a direct acting regulator, which is characteristic of a continuously acting device, having the same sensitivity as the indirect acting regulators referred to herebefore, has far superior characteristics with respect to maintaining voltage as far as parallel operation of the machine is concerned. This is because having matched the characteristic curves of the regulators the voltages never depart over a few tenths of a per cent and hence the wattless division between the machines is a minimum and the regulators are quite sensitive. If this desirable feature of the direct acting regulators as now used on smaller machines could be extended to the larger machines where indirect acting regulators are now almost universally employed, a superior regulatory system would be produced.

An object of this invention is to produce a new regulating system which is sensitive in operation and is direct acting being independent of power sources other than the machine to be regulated.

Another object of this invention is to provide a direct acting regulator system in which the regulating action is directly dependent upon the voltage of the machine to be regulated as modified by the reactive droop compensated voltage of the machine.

A further object of this invention is to provide in a direct acting regulating system of means responsive to the reactive droop compensated voltage of the machine to be regulated for controlling the operation of the regulator.

A more specific object of this invention is to provide in a regulating system for a dynamo-electric machine, a regulating generator having a control field winding the excitation of which is controlled in response to the reactive droop compensated voltage of the machine to be regulated.

Another object of this invention is to provide in a regulating system for a dynamo-electric machine, of a regulating generator having a control field winding disposed to be energized in accordance with the voltage of the machine to be regulated and a reactor connected in circuit relation with the control field winding disposed to modify the energization thereof in accordance with the reactive droop compensated voltage of the machine.

Other objects of this invention will become apparent from the following description when taken in conjunction with the accompanying drawing the single figure of which is a diagrammatic view of the apparatus and system embodying the teachings of this invention.

Referring to the drawing there is illustrated an alternating current generator 10 disposed to supply a load (not shown) through the load conductors 12, 14 and 16. The generator 10 comprises the field winding 18 and the armature 20 which is disposed to be driven by a suitable prime mover 22. The prime mover 22 illustrated in this instance is represented as one being supplied with steam controlled by a governor 24, which is connected to an oil pressure system which is utilized to control a part of the regulating apparatus as will be explained more fully hereinafter. The field windings 18 are connected to be supplied from a rotary direct current generator or self-excited exciter 26 which may be termed a regulating generator.

The regulating generator 26 schematically represented comprises the armature 28, a self-exciting winding 30 and two control field windings 32 and 34. The field windings 32 and 34 are so disposed that, when energized, their excitation effects are opposite, the winding 32 functioning to oppose an increase in the excitation of the regulating generator 26 and the winding 34 functioning to aid in increasing the excitation of the generator 26. Of course when the windings 32 and 34 are properly balanced the excitation effect of the one winding is offset by the excitation effect of the other winding.

The control field winding 32 is connected across the output terminals of a full-wave rectifier unit 36 the input terminals of which are connected by conductors 38 and 40 across the secondary windings 42 of a potential transformer 44, the primary windings 46 of which are connected to load conductors 12 and 16. The control field winding is thus connected to be directly energized in accordance with the potential across load conductors 12 and 16.

The control field winding 34 is also connected across the output terminals of a full-wave rectifier unit 48 to be energized in accordance with the generator voltage as modified by the reactive droop compensated voltage, depending upon the load supplied. Thus one of the input terminals of the rectifier unit 48 is connected by conductor 50 through conductor 38 to a terminal of the secondary winding 42 of the potential transformer 44 and the other of the input terminals of the unit 48 is connected through the alternating current winding 52 of a reactor 54 and and conductor 40 to the other terminal of the secondary winding 42 of potential transformer 44.

The reactor 54 is so constructed that its core member 56 which carries winding 52 is bridged by a spring member 58 disposed to be so magnetically attracted towards the core member 56 as to vary the air gap between the legs of the core member 56 and the spring member 58 and thus control the flux therebetween. Although not shown, the spring member 58 is of sufficient width to carry the Sylphon bellows 60 illustrated.

In order to provide liquid pressure for the bellows 60, the bellows is connected by conduit 62 through a small mouth orifice 64 to a conduit 66 which is connected to be supplied from the oil supply of the governor 24. A conduit 68 is connected between conduit 62 and a valve housing 70 which contains an electromagnetically actuated valve 72, the housing 70 being provided with a suitable drain 74 to a reservoir 76 from which the liquid can be pumped back into the system by means of the pump 78.

In constructing the reactor 54 and providing the spring force and the Sylphon bellows force, the spring and Sylphon forces are made large enough so that they and not the magnetic attraction predominate. Thus the control of the size of the reactor air gap will depend primarily upon the balance of the spring force and the Sylphon bellows force although it will be appreciated that the magnetic pull on the spring member may partially offset the spring force. This is permissible as long as the net force of the spring 58 increases as it approaches the legs of the reactor 54 and has the required stiffness for stability and speed.

In order to actuate the valve 72 and thus control the pressure of the oil in the Sylphon bellows 60, an electromagnet 80 is provided, the electromagnet having a winding 82 disposed to be energized in accordance with the reactive droop compensated voltage of the generator 10. Thus one terminal of the winding 82 is connected by conductor 84 to one of the terminals of the secondary winding 42 of potential transformer 44, and the other terminal of winding 82 is connected by conductor 86 to an adjustable tap of a reactive droop compensator resistor 88, a fixed terminal of which is connected to the other terminal of the secondary winding 42. The resistor 88 is connected across a current transformer 90 which is electrically associated with load conductor 14. Thus the winding 82 is energized in accordance with the voltage of generator 10 and the reactive droop compensation voltage as measured by the droop compensator 88. In order to prevent hunting, a damping transformer 92 is connected with its secondary winding in the circuit for energizing winding 82, the primary winding of the transformer being connected across the output of the regulating generator 26.

In operation, assuming that the prime mover 22 is driving the generator 10 and the regulating generator 26 to provide a predetermined generator voltage and that the opposed windings 32 and 34 are balanced so that the self-energizing winding 30 maintains the required excitation of regulating generator 26, the valve 72 must be so positioned that the opposing Sylphon bellows force and the spring force are properly balanced to maintain a predetermined air gap for reactor 54. If the load supplied by generator 10 should vary, as for example, change so that the generated voltage decreases, then the energization of winding 82 decreases to open the valve 72 to permit more oil to escape therethrough to the drain 74 and thus lower the pressure in the Sylphon bellows 60.

As the pressure in the bellows 60 is decreased the force of the spring 58 actuates the spring 58 in a direction away from the legs of the reactor 54, as viewed in the drawing, to increase the reactor air gap. As the air gap of reactor 54 increases, the reactance of the reactor decreases and a larger current flows in winding 52 to the rectifier unit 48 and consequently through the control field winding 34. This increase in current flow through the control field winding 34 results in an unbalance between the energization effects of the opposed control field windings 32 and 34 with the result that the net force of winding 34 predominates to effect an increase in the voltage of the regulating generator 26 to increase the current flow through field winding 18 and the voltage of the generator 10.

As the voltage of generator 10 approaches the predetermined value which is to be maintained, the energization of the winding 82 increases to actuate the valve 72 upwardly to its normal position to so control the oil pressure to the Sylphon 60 that the spring 58 and Sylphon 60 cooperate to control the reactor air gap and increase the reactance of reactor 54 to its normal value whereby control field windings 32 and 34 are again balanced. As the regulating generator 26 is a completely self-excited machine it will maintain operation at the corrected voltage, the excitation being controlled from time to time by operation of the valve 72 as required by the demands on the system.

The operation of the system for an increase in the generator voltage is readily understood, being the opposite of that described hereinbefore. For example as the voltage of generator 10 increases above the value required to be maintained, valve 72 is actuated upwardly to effect an increase in the Sylphon pressure and force the spring 58 in a direction to decrease the reactor air gap, increase the reactance of reactor 54 and thereby decrease the current flow through control field windings 34. Thus the energization effect of control field winding 32 predominates to oppose the effect of field winding 30 and decrease the output of the regulating generator 26 and consequently decrease the excitation of generator 10 to lower the voltage thereof to the regulated value. Again, as in the previous instance, as the generator voltage is corrected, the position of the valve 72 is adjusted to vary the Sylphon pressure and change the reactance of reactor 54 to its normal value whereby control field windings 32 and 34 are again in balanced relation.

In both instances of operation described, the damping transformer 92 functions in a well known manner to induce a voltage in its secondary winding which will have a damping action on the energization of energizing winding 82 in anticipation of the corrective regulating action. This is desirable as the reactor 54 and the electromagnetic valve 70 have a slight time delay in their operation.

The system of this invention has stability and speed. By employing the reactor controlled by the operation of valve 72 a power amplifying mechanism is provided which is economical and which can readily be reproduced. Further where the pressure applied to the spring 58 is obtained from the same oil that is used in the governor 24, as shown in the drawing, the operation of the reactor 54 is directly dependent upon the governor and the pressure is therefore an indication of the operation of the prime mover 22 and of the machine to be regulated. The pressure is thus available as long as the machine is being operated. Such power amplifying mechanism makes it possible to use a direct acting regulator on large machines where indirect acting regulators have been previously employed.

I claim as my invention:

1. In a regulating system for a dynamo-electric machine having a field winding and disposed to supply a reactive load, in combination, means disposed for operation to control the excitation of the field winding of the dynamo-electric machine, means disposed to be energized in response to the voltage of the dynamo-electric machine for controlling the operation of the exciting means, a reactor connected in circuit relation with the voltage responsive means, a medium under pressure indicative of the operation of the dynamo-electric machine, means responsive to the pressure of said medium for controlling the reactance of the reactor, and means responsive to the reactive droop compensated voltage of the dynamo-electric machine for controlling the pressure applied to the pressure responsive means.

2. In a regulating system for a dynamo-electric machine having a field winding and disposed to supply a reactive load, in combination, means disposed for operation to control the excitation of the field winding of the dynamo-electric machine, means disposed to be energized in response to the voltage of the dynamo-electric machine for controlling the operation of the exciting means, a reactor connected in circuit relation with the voltage responsive means, a fluid under pressure indicative of the operation of the dynamo-electric machine, means responsive to the pressure of said fluid for controlling the reactance of the reactor and modify the energization of the voltage responsive means, and means responsive to the reactive droop compensated voltage of the dynamo-electric machine for controlling the fluid pressure supplied to the pressure responsive means.

3. In a regulating system for a dynamo-electric machine having a field winding and disposed to supply a reactive load, in combination, an exciter for supplying the field excitation of the dynamo-electric machine, the exciter having a control field winding disposed to be energized in accordance with the voltage of the dynamo-electric machine, a reactor connected in circuit relation with the control field winding, a medium under pressure indicative of the operation of the dynamo-electric machine, means responsive to the pressure of said medium for controlling the reactance of the reactor, and means responsive to the reactive droop compensated voltage of the dynamo-electric machine for controlling the pressure applied to the pressure responsive means.

4. In a regulating system for a dynamo-electric machine having a field winding and disposed to supply a reactive load, in combination, an exciter for supplying the field excitation of the dynamo-electric machine, the exciter having a pair of opposed control field windings disposed to be energized in accordance with the voltage of the dynamo-electric machine, a reactor connected in circuit relation with one of the pair of opposed control field windings, a fluid under pressure indicative of the operation of the dynamo-electric machine, means reponsive to the pressure of said fluid for controlling the reactance of the reactor and modify the energization of the one of the pair of opposed control field windings, and means responsive to the voltage of the dynamo-electric machine for controlling the fluid pressure supplied to the pressure responsive means.

5. In a regulating system for a dynamo-electric machine having a field winding and disposed to supply a reactive load, in combination, means disposed for operation to control the excitation of the field winding of the dynamo-electric machine, means disposed to be energized in response to the voltage of the dynamo-electric machine for controlling the operation of the exciting means, a reactor having an air gap connected in circuit relation with the voltage responsive means, a medium under pressure indicative of the operation of the dynamo-electric machine, means responsive to the pressure of said medium disposed to vary the air gap for controlling the reactance of the reactor to modify the energization of the voltage responsive means, and means responsive to the voltage of the dynamo-electric machine for controlling the pressure applied to the pressure responsive means.

6. In a regulating system for a dynamo-electric machine having a field winding and disposed to supply a reactive load, in combination, means disposed for operation to control the excitation of the field winding of the dynamo-electric machine, means disposed to be energized in response to the voltage of the dynamo-electric machine for controlling the operation of the exciting means, a reactor having an air gap connected in circuit relation with the voltage responsive means, a medium under pressure indicative of the operation of the dynamo-electric machine, means responsive to the pressure of said medium disposed to vary the air gap for controlling the reactance of the reactor to modify the energization of the voltage responsive means, a valve disposed to be operated to control the pressure applied to the pressure responsive means, and electromagnetic means responsive to the reactive droop compensated voltage of the dynamo-electric machine for controlling the operation of the valve.

7. In a regulating system for a dynamo-electric machine having a field winding and disposed to supply a reactive load, in combination, an exciter for supplying the field excitation of the dynamo-electric machine, the exciter having a pair of opposed control field windings disposed to be energized in accordance with the voltage of the dynamo-electric machine, a reactor having an air gap connected in circuit relation with one of the pair of opposed control field windings, a fluid under pressure indicative of the operation of the dynamo-electric machine, means responsive to the pressure of said fluid for varying the air gap to control the reactance of the air gap and modify the energization of the one of the pair of opposed control field windings, a valve disposed to be operated to control the fluid pressure applied to the pressure responsive means, and electromagnetic means responsive to the reactive droop compensated voltage of the dynamo-electric machine for controlling the operation of the valve.

8. In a regulating system for a dynamo-electric machine having a field winding and which is disposed to be driven by a prime mover having a governor associated therewith connected to an oil supply for supplying a reactive load, in combination, means disposed for operation to control the excitation of the field winding of the dynamo-electric machine, means disposed to be energized in response to the voltage of the dynamo-electric machine for controlling the operation of the exciting means, a reactor connected in circuit relation with the voltage responsive means, means connected to the governor and responsive to the oil pressure thereof for controlling the reactance of the reactor, a valve disposed to be operated to control the oil pressure applied to the pressure responsive means, and electromagnetic means responsive to the reactive droop compensated voltage of the dynamo-electric machine for controlling the operation of the valve.

EDWIN L. HARDER.

REFERENCES CITED

The following references are of record in the file of this patent:

UNITED STATES PATENTS

| Number | Name | Date |
|---|---|---|
| 1,768,165 | Stokes | June 24, 1930 |
| 1,929,382 | Arthur | Oct. 3, 1933 |
| 1,954,563 | De Malaussene | Apr. 10, 1934 |
| 2,180,796 | Claytor | Nov. 21, 1939 |
| 2,412,442 | Crever | Dec. 10, 1946 |

FOREIGN PATENTS

| Number | Country | Date |
|---|---|---|
| 834,163 | France | Aug. 8, 1938 |